United States Patent [19]
Shih et al.

[11] Patent Number: 5,889,112
[45] Date of Patent: Mar. 30, 1999

[54] STAGED FEEDING PROCESS FOR MIXING POLYMERS

[75] Inventors: Chi-Kai Shih, Chadds Ford, Pa.; Daniel Gregory Tynan, Wilmington; Rita Sue McMinn, Newark, both of Del.

[73] Assignee: E. I. Du Pont de Nemours and Company, Wilmington, Del.

[21] Appl. No.: 975,881

[22] Filed: Nov. 21, 1997

Related U.S. Application Data

[63] Continuation of Ser. No. 410,582, Mar. 27, 1995, abandoned, which is a continuation of Ser. No. 67,248, May 28, 1993, abandoned.

[51] Int. Cl.⁶ ........................... C08G 63/48; C08G 63/91
[52] U.S. Cl. ................................ 525/63; 525/64; 525/66
[58] Field of Search .................. 525/66, 63, 64

[56] References Cited

U.S. PATENT DOCUMENTS

| | | | |
|---|---|---|---|
| 3,596,320 | 8/1971 | Manning et al. | 18/12 |
| 3,767,754 | 10/1973 | Manning et al. | 264/176 |
| 4,014,524 | 3/1977 | Klingebiel | 259/6 |
| 4,142,805 | 3/1979 | Tadmor | 366/97 |
| 4,174,358 | 11/1979 | Epstein | 525/183 |
| 4,194,841 | 3/1980 | Tadmor | 366/75 |
| 4,198,168 | 4/1980 | Penn | 366/336 |
| 4,213,709 | 7/1980 | Valsamis | 366/76 |
| 4,289,407 | 9/1981 | Puthawala | 366/75 |
| 4,329,065 | 5/1982 | Hold et al. | 366/97 |
| 4,338,274 | 7/1982 | Hill | 264/171 |
| 4,409,167 | 10/1983 | Kolouch et al. | 264/102 |
| 4,411,532 | 10/1983 | Valsamis et al. | 366/99 |
| 4,413,913 | 11/1983 | Hold et al. | 366/75 |
| 4,421,412 | 12/1983 | Hold et al. | 366/76 |
| 4,446,090 | 5/1984 | Lovgren et al. | 264/211 |
| 4,474,475 | 10/1984 | Moriyama | 366/85 |
| 4,478,516 | 10/1984 | Kessler | 366/87 |
| 4,480,923 | 11/1984 | Mehta | 366/99 |
| 4,486,099 | 12/1984 | Tadmor | 366/99 |
| 4,514,163 | 4/1985 | Nakamura | 425/204 |
| 4,534,652 | 8/1985 | Stade | 366/85 |
| 4,547,541 | 10/1985 | Golba, Jr. | 524/151 |
| 4,582,432 | 4/1986 | Mehta | 366/75 |
| 4,582,433 | 4/1986 | Mehta | 366/76 |
| 4,757,112 | 7/1988 | Phadke | 525/66 |
| 4,948,838 | 8/1990 | Jodamus et al. | 525/66 |
| 5,010,136 | 4/1991 | Ohmae et al. | 525/66 |
| 5,216,075 | 6/1993 | Papazoglou | 525/66 |
| 5,221,712 | 6/1993 | Ohmae et al. | 525/66 |
| 5,242,975 | 9/1993 | Modic | 525/66 |
| 5,292,808 | 3/1994 | Ohmae et al. | 525/113 |
| 5,387,647 | 2/1995 | Eichenauer et al. | 525/66 |

FOREIGN PATENT DOCUMENTS

| | | | |
|---|---|---|---|
| 0 260 035 | 3/1988 | European Pat. Off. | C08L 77/00 |
| 0 279 502 | 8/1988 | European Pat. Off. | C08L 67/00 |
| 0 375 389 | 6/1990 | European Pat. Off. | C08L 77/00 |
| 25 51 352 | 5/1977 | Germany | B29B 1/10 |
| 1 455 663 | 11/1976 | United Kingdom | B01F 3/105 |

OTHER PUBLICATIONS

G. Serpe et al., *Poly. Eng. Sci.*, 30(9):553–565 (Mid–May 1990).
B. D. Favis et al., *Polymer*, 29:1761–1767 (Oct. 1988).
H. P. Grace, *Chem. Eng. Commun.*, 14:225–277 (1982).

*Primary Examiner*—Morton Foelak

[57] ABSTRACT

A staged feeding process for preparing a composition by mixing at least a first polymer and a second, dissimilar polymer forms a final composition comprising a uniform, small-particle dispersion of the first polymer in a matrix of the second polymer. Preferably, the first polymer has a melt viscosity greater than the second polymer. The process comprises the steps of feeding the first polymer in a first feed stage and feeding all of the second polymer as a melt at least two feed stages to mix the first and second polymers. Alternatively, the process may comprise feeding the first polymer in a first feed stage and feeding all of the second polymer in at least two feed stages subsequent to the first feed stage. In either case, this mixing initiates a chemical reaction between the first and second polymers.

9 Claims, No Drawings

STAGED FEEDING PROCESS FOR MIXING POLYMERS

This is a continuation, of application Ser. No. 08/410,582, filed Mar. 27, 1995, now abandoned, which is a continuation of application Ser. No. 08/067,248 filed on May 28, 1993, now abandoned.

BACKGROUND OF THE INVENTION

1. Field of the Invention

The present invention relates to a staged feeding process for mixing at least two polymers to prepare a composition comprising a uniform, small-particle dispersion of one polymer in a matrix of another polymer, where the one polymer has a melt viscosity greater than the other polymer. In particular, the present invention relates to a process for mixing rubber and nylon to obtain a fine dispersion of rubber in nylon, where the viscosity of the rubber greatly exceeds that of nylon.

2. Description of the Related Art

Toughened engineering polymers, sold under the trademarks Zytel®, Delrin®, Rynite®, Minlon®, and Bexloy®, all registered trademarks of E. I. du Pont de Nemours and Company of Wilmington, Del., have mechanical properties that meet a wide range of automotive, appliance and construction industry strength and longevity requirements. To enhance toughness and impact strength of these materials, fine rubber droplets may be dispersed in the polymer matrix of these materials. The impact strength of these materials is improved dramatically when the droplets are below a desired size.

Processes for mixing dissimilar, or immiscible polymers, i.e., polymers having non-zero interfacial tensions, as solids in a single stage are known. For instance, U.S. Pat. No. 4,174,358 to Epstein discloses the preparation of toughened thermoplastic polymers by the dry blending of the solid constituents with subsequent coincidental mixing and melting. A fine dispersion of rubber in a polymer matrix is formed by feeding pre-blended pellets of polymer and rubber to a co-rotating twin-screw compounding extruder. In this process, the extruder melts the solid pellets and simultaneously mixes the polymer and the rubber. The rubber is well dispersed as droplets of the desired size in the final composition.

Attempts have been made to introduce all of the nylon and rubber as melts simultaneously into a mixer in a single-stage feeding process in amounts that will produce a preponderance of the nylon. The nylon and the rubber are mixed in a flow field of rotational shear. However, this process fails to produce a fine dispersion. Because of the preponderance of nylon in this all-melt process, the nylon constitutes the continuous phase. The far more viscous discontinuous phase (rubber and functionalized rubber) does not break into small droplets. This is not surprising since it has been found that a fine dispersion of a more viscous polymer in another, less viscous polymer will not occur if the viscosity of the more viscous polymer is more than about 3.5 times that of the less viscous polymer, as explained by H. P. Grace's experiments with immiscible, Newtonian fluids. See H. P. Grace, Dispersion Phenomena in High Viscosity Immiscible Fluid Systems and Application of Static Mixers as Dispersion Devices in Such Systems, published in *Chemical Engineering Communication*, Vol. 14, 225–277 (1982).

On the other hand, when the known solid-feed process as described above is performed with rubber and nylon, it creates a more viscous continuous phase of rubber. As the nylon melts, it forms a discontinuous phase of less viscous droplets which break readily into smaller droplets because of the viscosity ratio of the discontinuous phase to the continuous phase. This enables grafting to occur, which leads to further dispersion due to a reduction of interfacial surface tension between the rubber and nylon.

When the volume fraction of two polymers is roughly equivalent, upon coincidental melting and mixing in a single stage process, they combine to form a morphological state described as co-continuous, or having a dual-phase continuity, in which one cannot identify a distinctive, discontinuous fluid phase. Thus, no dispersion is created by this mixing. This result is described by B. D. Favis and J. P. Chalifoux in an article titled "Influence of Composition on the Morphology of Polypropylene/Polycarbonate Blends" in Polymer, Vol. 29, pp. 1761–1767 (October, 1988), which discusses blending polypropylene and polycarbonate in a batch mixer.

Staged feeding processes for mixing similar, or miscible, polymers to obtain a homogeneous, multi-component, single-phase composition are also known. For instance, Published Patent Specification DT 2 551 352 to Zettler et al. discloses a staged feeding process for mixing similar components where a low-viscosity component is added to a high-viscosity component already present in an extruder. In a specific embodiment, a high-viscosity component (a high-molecular weight polyisobutylene component) is fed as a solid to a first stage of an extruder, and a low-viscosity component (a low-molecular weight polyisobutylene component) is fed as a melt to subsequent stages of the extruder. The result is a gel-free, homogeneous, single-phase composition consisting of 6% of the high-molecular weight polyisobutylene component and 94% of the low-molecular weight polyisobutylene component.

It is also a known process to feed all rubber and part nylon as solids to a first stage, and to subsequently feed the nylon as melt to latter stages. However, the rate of manufacture of this process could be improved.

SUMMARY OF THE INVENTION

The present invention recognizes a need for a more rapid and efficient process for mixing polymers to produce toughened polymers. The present invention fulfills this need by providing an all-melt process having an improved rate of manufacture over the prior art. The present invention also provides a staged feeding process which reduces the interfacial surface tension between polymers being mixed, and thus aids in the fragmentation of one polymer in another.

There are numerous reasons why a satisfactory all-melt process, as compared to a solid-feed process, is desirable. When manufacturing toughened polymers comprising dissimilar polymer components, large amounts of energy are required to fragment the high-viscosity polymer into a fine particle dispersion which is uniformly embedded in a matrix of lower viscosity polymer. In an all-melt process, power cost is reduced because the step of pelletizing and then re-melting the polymers is eliminated. In addition, since re-melting the polymers may cause some degradation, the possibility of polymer degradation is reduced. Also, the mixing of the polymers in an all-melt process is closed, without the transport of pellets from the pelletizer to the mixer, which reduces out-of-pocket costs. Furthermore, the polymer is not exposed to contamination, which may occur during the melting of the polymer, prior to mixing.

In addition, a low-powered and hence presumably low-cost mixer can be employed with the all-melt process of the present invention, due to the elimination of the melting step. Because the mixer does not have to melt or pump, it can always be operated at the temperature and speed optimal for mixing. Moreover, with the present invention, it is possible to employ a mixer with rotors that do not have to be re-configured for mixing different polymers formulations, as is often required with known processes.

A further advantage of the all-melt process of the present invention is that it permits the use of a much broader range of tougheners than do processes of the prior art. Current manufacturing technology requires that the polymers, or a major portion thereof, be fed to a twin-screw compounding extruder as pellet feeds, which are metered via solid feeders. As a consequence, the processes of the prior art are restricted to using pelletizable polymers as tougheners, since only those polymers that can be put in pellet form can be fed by solid feeders. Polymers that can be pelletized (without subsequent agglomeration) represent but a fraction of the polymers which might be used as tougheners.

In order to achieve the foregoing advantages, there is provided a staged feeding process for preparing a composition by mixing at least a first polymer and a second, dissimilar polymer. The process comprises the steps of feeding the first polymer in a first feed stage; and feeding all of the second polymer as a melt in at least two feed stages, wherein the first polymer has a melt viscosity greater than the second polymer, thereby mixing the first and second polymers to initiate a chemical reaction therebetween to form a uniform, small-particle dispersion of the first polymer in a matrix of the second polymer.

Further in accordance with the present invention, there is provided a staged feeding process for preparing a composition by mixing at least a first polymer and a second, dissimilar polymer. The process comprises the steps of feeding the first polymer in a first feed stage; and feeding all of the second polymer in at least two feed stages subsequent to the first feed stage, wherein the first polymer has a melt viscosity greater than the second polymer, thereby mixing the first and second polymers to initiate a chemical reaction therebetween to form a uniform, small particle dispersion of the first polymer in a matrix of the second polymer.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 is a cross-sectional view of a batch mixer illustrating a staged feeding process according to one embodiment of the present invention.

FIG. 2 is a schematic view of a continuous mixer illustrating a staged feeding process according to another embodiment of the present invention.

FIG. 3 is a schematic view of a continuous mixer illustrating a staged feeding process according to yet another embodiment of the present invention.

DESCRIPTION OF THE PREFERRED EMBODIMENTS

Reference will now be made in detail to the present preferred embodiments of the invention, examples of which are illustrated in the accompanying drawings. Whenever possible, the same reference numbers will be used throughout the drawings to refer to the same or like parts.

In accordance with the present invention, there is provided a staged feeding process for preparing a composition by mixing at least a first polymer and a second, dissimilar polymer. It should be understood that while the description below of the process of the invention is directed to mixing two polymers, it is within the scope of the present invention to mix together a plurality of polymers, as long as at least two of the polymers are dissimilar. The method of the present invention is particularly useful for mixing at least a first and a second polymer where the melt viscosity of the first polymer is at least 3.5 times the melt viscosity of the second polymer. The present invention may work with a variety of polymers, as long as the melt viscosity of the first polymer is greater than the melt viscosity of the second polymer. For instance, the first polymer may be an elastomer, such as the dipolymer ethylene/propylene, the terpolymer ethylene/propylene/diene (EPDM) or a tetrapolymer, etc., wherein a portion of the elastomer has reactive functional groups. The second polymer may be a thermoplastic polyamide, such as nylon 66. Other polymers may include, but are not limited to the following: nylon, polyethylene terephthalate (PET), functionalized synthetic rubber, copolymers containing reactive functional groups, for example, copolymers of styrene, such as styrene maleic anhydride copolymer, functionalized styrene hydrogenated butadiene block copolymer, sold under the trademark Kraton® by Shell Chemical Company of Houston, Tex., polybutylene terephthalate (PBT), ethylene/glycidal methacrylate copolymer and ethylene/acrylate/glycidal methacrylate copolymer. Also, it should be realized that it is within the scope of the present invention to mix the first and the second polymers together when other substances, such as antioxidant, colorant or solid filler are present, as long as the first and the second polymers are dissimilar.

The process of the present invention comprises the step of feeding the first polymer in a first feed stage. A mixer used to perform a staged feeding process according to a first embodiment of the present invention is shown generally at 10 in FIG. 1. Mixer 10 as shown in FIG. 1 comprises a housing 12, a pair of rotors 14, 16, respectively, and an inlet port 18. Continuous mixers used to perform staged feeding process according to second and third embodiments of the present invention are shown generally at 10' and 10" in FIGS. 2 and 3, respectively. Any conventional mixer is suitable for use with the present invention. Particular examples include single screw extruders, twin screw co-rotating extruders, twin screw counter-rotating extruders, etc., or plasticating devices, such as Brabender, Haake or Banbury devices or the like. The process is not dependent upon any particular extruder size or screw geometry. However, a particular extruder design may be preferred for certain polymers to provide suitable mixing and to avoid degradation during blending.

The sequence of feed stages is designated by letters A–E in FIG. 1, A'–E' in FIG. 2 and A"–E" in FIG. 3. The sequence of feed stages in the Figures illustrates, by example, five feed stages. The sequence of dots in the Figures indicates that there may be more than the five feed stages in these embodiments of the present invention, it of course being understood that there may be fewer, but at least two. The first polymer is fed in the mixer as shown at arrow A in FIG. 1, in stage A' of the mixer as shown at arrow 20' in FIG. 2 and in stage A" of the mixer as shown at arrow 20" in FIG. 3. The present invention may also include the step of feeding the first polymer in the first feed stage and in at least one of the feed stages which is subsequent to the first feed stage. Thus, the first polymer may be added at arrows B–E, etc., in FIG. 1, or in stages B'–E', etc. in FIG. 2 or in stages B"–E" in FIG. 3.

The process of the present invention also comprises the step of feeding the second, dissimilar polymer in at least two stages to mix the first and the second polymers. This step may be achieved by feeding all of the second, dissimilar polymer as a melt in at least two feed stages, or feeding all of the second, dissimilar polymer in at least two feed stages subsequent to the first feed stage. In either case, the step of feeding the second polymer may be effected by feeding the second polymer in one feed stage at spaced intervals over time in a batch-type mixer as shown in FIG. 1 or by feeding the second polymer in at least two physically separate feed stages in a continuous mixer as shown in either FIG. 2 or FIG. 3. Thus, according to the first embodiment as illustrated in FIG. 1, the step of feeding the second polymer comprises feeding the second polymer in the mixer as shown at arrow B, C, D, E, etc. at spaced intervals over time. According to the second embodiment of the present invention, the step of feeding the second polymer comprises feeding the second polymer in the first feed stage and in a feed stage subsequent to the first feed stage. As illustrated in FIG. 2, a first portion of the second polymer is fed in the first feed stage as shown at arrow 22', and a second portion of the second polymer is fed in a second feed stage as shown at arrow 24'. In the case of the first or second embodiments where all of the second polymer is fed as a melt in at least two feed stages, the term "first stage" does not necessarily mean first in time or in physical sequence, so that the first polymer may be added between the at least two stages additions of the second polymer. For instance, the first polymer can be fed into stage B or B', and the second polymer can be fed into stage A or A' and into stage C or C' or any subsequent stage. According to the third embodiment of the present invention, the step of feeding the second polymer comprises feeding the second polymer in at least two feed stages subsequent to the first feed stage. As illustrated in FIG. 3, a first portion of the second polymer is fed in the second feed stage as shown at arrow 22", and a second portion of the second polymer is fed in a third feed stage as shown at arrow 24".

The mixing of the first and second polymers initiates a chemical reaction therebetween. The chemical reaction aids in the fragmentation of the first polymer by reducing the interfacial surface tension between the first polymer and the second polymer. The mixing of the first and second polymers forms a final composition comprising a uniform, small-particle dispersion of the first polymer in a matrix of the second polymer.

The volume fraction is defined as the ratio of the second polymer and a component (meaning any component) soluble therewith at the mixing temperature of the polymers ($P_2$) to the total volume of the first and second polymers and a component (again meaning any component) soluble with each of the first and second polymers at the mixing temperature of the polymers, respectively, ($P_1+P_2$) as follows:

$$\text{Volume fraction} = \text{Volume }(P_2)/[\text{Volume }(P_1+P_2)] \quad (1)$$

According to the present invention, where either all of the second polymer is fed as a melt or where all of the second polymer is fed in at least two feed stages subsequent to the first feed stage, in any of the first through third embodiments, the volume fraction is in the range of about 0.4 to 0.6 in at least one of the feed stages to enhance the chemical reaction. In a preferred case, an intermediary composition, formed when the volume fraction is in the range of about 0.4 to 0.6, comprises a uniform, small-particle dispersion of the first polymer in a matrix of the second polymer prior to achieving the final composition. This dispersion will be present if sufficient chemical grafting between the first and second polymers has occurred. The volume fraction may be in the range of about 0.4 to 0.6 upon the initial addition of the second polymer to the first polymer. Alternatively, the volume fraction may be in the range of about 0.4 to 0.6 upon the subsequent addition of the second polymer to the first polymer.

In the case where all of the second polymer is fed as a melt or the case where all of the second polymer is fed in at least two feed stages subsequent to the first feed stage, in any of the first through third embodiments, the first polymer may be fed as a melt or alternatively as a solid. In the latter case, where the second polymer is fed in at least two feed stages subsequent to the first feed stage and the first polymer is fed as a melt, the second polymer may be fed as a solid. Alternatively, in the case where the second polymer is fed in at least two feed stages subsequent to the first feed stage and the first polymer is fed as a solid, the second polymer may be fed as a solid.

In the case where all of the second polymer is fed as a melt or the case where all of the second polymer is fed in at least two feed stages subsequent to the first feed stage, in any of the first through third embodiments, at least a portion of the first polymer and a portion of the second polymer each has a reactive functional group so that at least a fraction of one of the first and second polymers is grafted in-situ onto at least a fraction of the other of the first and second polymers upon mixing. It is believed that this grafting reduces the interfacial tension between the first and second polymers prior to the dispersion of the first polymer in the matrix of the second polymer. One example of grafting occurs when the reactive functional group of the first polymer comprises either di-acids or anhydrides, or a combination of both of these, and the reactive functional group of the second polymer comprises amines. The grafting can be inherent in the polymers. Alternatively, a grafting agent, such as a mixture of peroxide and maleic anhydride, may be fed in at least one of the feed stages to induce grafting of at least a fraction of one of the first and second polymers onto the other of the first and second polymers.

According to a preferred case of the first through third embodiments of the present invention, there is provided a staged feeding process for preparing a composition by mixing the dipolymer ethylene/propylene rubber and nylon, where all the nylon is molten. The rubber may alternatively be the terpolymer ethylene/propylene/diene (EPDM) or a tetrapolymer, etc. This preferred embodiment is described in the Examples below. The process comprises the step of feeding the rubber in a first feed stage, where the rubber comprises at least one anhydride reactive functional group. The process also comprises the step of feeding a first portion of the molten nylon in a second feed stage and a second portion of the nylon melt in a third feed stage, thereby mixing the rubber and the nylon. This mixing initiates a chemical reaction between the rubber and the nylon to form a final composition comprising a uniform, small-particle dispersion of the rubber in a matrix of the nylon. The chemical reaction aids in the fragmentation of the rubber by reducing the interfacial surface tension between the nylon and the rubber.

The invention will be further clarified by the following Examples, which are intended to be purely exemplary of the invention.

EXAMPLE 1

In this control Example a rubber-toughened nylon composition was prepared by adding 81 parts by weight (p.b.w.)

Zytel® 101 (nylon 66) with an average molecular weight of 17,000 and amine ends content of 50 milli-equivalent per kg. in pellet or solid form and 19 p.b.w. EPDM rubber grafted with 2% fumaric acid in pellet or solid form to a Brabender batch mixer, Model EPL-V7754 sold by C.W. Brabender Instrument, Inc. of South Hackensack, N.J. In this test all of the functionalized rubber and all of the nylon were added to the same stage of the mixer at the same time and allowed to melt in a quiescent state at 275° C. The ingredients were subsequently mixed at a rotor speed of 50 RPM for five minutes. The mixture was quenched, molded and analyzed using transmission electron microscopy (TEM) at 4640X. The final composition contained a particle dispersion of rubber in a matrix of nylon, where the mean particle size was about 0.60 microns.

EXAMPLES 2–6

Rubber-toughened nylon was prepared using a 28 mm. co-rotating twin screw extruder, manufactured by Werner & Pfleiderer Corporation of Ramsey, N.J. with four feed stages (A" through D"), similar to that shown in FIG. 3, by introducing rubber at feed stage A" and feeding nylon in stages B" through D" in feed ratios as specified in Table 1. The extruder was fed by separate feed ports at each stage. Each of the feed ports communicated with a working section in the extruder barrel. All of the working sections comprised a neutral kneading block 30 mm. long and a 24 mm. lead, followed by an 8 mm. long screw bushing.

Ground, blended pellets of 9 p.b.w. Nordel® 3681 (ethylene/propylene/hexadiene hydrocarbon rubber) and 10 p.b.w. TRX 101 (Nordel® with fumaric acid functionality) were introduced in the first working section of the extruder, designated as stage A" in FIG. 3. The rubber was melted at a temperature of about 280° C. before the downstream addition of the nylon.

Pellets of 81 p.b.w. Zytel® 101 (nylon) with a number average molecular weight of 17,000 and amine ends content of 50-milli-equivalent per kg. were melted in a single screw extruder and pumped via separate gear pumps to feed stages B", C" and D" under independent flow regulation at a temperature of about 280° C. All of the rubber was introduced into stage A" for each Example. The 81 parts of nylon melt were apportioned to the feed stages in a variety of ways as summarized in Table 1 below in terms of weight percent (parts) and the volume fraction for each stage. The impact strength of molded specimens of rubber-toughened polymer produced in each Example at room temperature was determined as described in ASTM D-256-56 and is listed as Notched Izod values (N.I.) in Table 1 below. N.I. values above 5 are considered good for rubber-toughened nylon.

fraction of the polymer is in the range of about 0.4 to 0.6 upon initial addition of the nylon to the rubber.

Other embodiments of the invention will be apparent to those skilled in the art from consideration of the specification and practice of the invention disclosed herein. It is intended that the specification and Examples be considered as exemplary only, with a true scope and spirit of the invention being indicated by the following claims.

What is claimed is:

1. A staged feeding process for preparing a composition by mixing at least a first polymer and a second, dissimilar polymer, comprising the steps of:

(a) feeding the first polymer in a first feed stage; and (b) feeding all of the second, dissimilar polymer as a melt in at least two feed stages, wherein the first polymer has a melt viscosity at least 3.5 times greater than that of the second polymer, thereby mixing the first and second polymer to initiate a chemical reaction therebetween to form a final composition comprising a dispersion of the first polymer in a matrix of the second polymer, wherein at least a portion of the first polymer and a portion of the second polymer each has a reactive functional group so that upon mixing, at least a fraction of one of the first and second polymer is grafted in-situ onto at least a fraction of the other of the first and second polymers.

2. The process of claim 1, wherein the first polymer is an elastomer and the second polymer is polyamide.

3. The process of claim 2, wherein the elastomer is ethylene/propylene rubber with at least one anhydride reactive functional group and the polyamide is nylon 66.

4. The process of one of claim 1, wherein feeding step (b) comprises feeding the second polymer in at least two physically separate feed stages.

5. The process of claim 1, wherein the step of feeding the second polymer comprises feeding the second polymer in at least two feed stages subsequent to the first feed stage.

6. The process of claim 1, wherein the final composition has a Notched Izod value of at least 5 at room temperature.

7. The process of claim 2, wherein the elastomer is ethylene/propylene/hexadiene hydrocarbon rubber with at least one anhydride reactive functional group and the polyamide is nylon 66.

8. The process of claim 1, wherein feeding step (b) comprises feeding the second polymer at spaced intervals over time in a batch mixer.

9. The process of claim 1, wherein the step of feeding the second polymer comprises feeding the second polymer in

TABLE 1

| EXAMPLE | FEED A Parts (Feed)/ Vol. Frac. (Mixture) | FEED B Parts (Feed)/ Vol. Frac. (Mixture) | FEED C Parts (Feed)/ Vol. Frac. (Mixture) | FEED D Parts (Feed)/ Vol. Frac. (Mixture) | AVERAGE PARTICLE SIZE (MICROMETER) | N. I. (FT-LB/IN) |
|---|---|---|---|---|---|---|
| 2. (104-3-1) | 19/0 | | | 81/0.79 | 1.30 | 3.2 |
| 3. (104-1-2) | 19/0 | 6.3/.23 | 8.6/.41 | 66.1/.79 | 1.65 | 6.6 |
| 4. (104-2-11) | 19/0 | | 24.2/.53 | 56.8/.79 | 0.82 | 17.8 |
| 5. (104-2-21) | 19/0 | | 17.9/.46 | 63.1/.79 | 0.92 | 17.2 |
| 6. (104-1-1) | 19/0 | 14.9/.41 | 25.5/.66 | 40.6/.79 | 0.69 | 14.1 |

In comparing Examples 2–6 with control Example 1, the benefits of staged feeding nylon melt to achieve uniform small particle dispersions and high impact strengths are apparent. Increased benefits are obtained if the volume the first feed stage and in a feed stage subsequent to the first feed stage.

\* \* \* \* \*